United States Patent [19]
Daab et al.

[11] 3,921,770
[45] Nov. 25, 1975

[54] ARRANGEMENT FOR DRIVING TWO OUTPUT SHAFTS

[75] Inventors: Heinz Daab; Rudolf Kling, both of Darmstadt, Germany

[73] Assignee: Quick-Rotan Becker & Notz KG, Darmstadt, Germany

[22] Filed: May 22, 1974

[21] Appl. No.: 472,380

[30] Foreign Application Priority Data
May 23, 1973 Germany............................ 2326275

[52] U.S. Cl. .......... 192/12 D; 192/18 B; 192/84 R; 192/103 R; 112/219 A; 112/220
[51] Int. Cl.² ................ B60K 41/24; F16D 13/22; D05B 69/00
[58] Field of Search ..... 192/12 D, 17 C, 18 B, 48.1, 192/48.7, 84 AA, 84 R, 84 C, 103 R; 310/94, 95; 318/39, 571; 112/219 A, 220

[56] References Cited
UNITED STATES PATENTS

| | | | |
|---|---|---|---|
| 2,740,510 | 4/1956 | Berthold............................ | 192/12 D |
| 2,881,882 | 4/1959 | Gentile ............................. | 192/12 D |
| 3,516,526 | 6/1970 | Seesselberg...................... | 192/12 D |
| 3,573,581 | 4/1971 | Dutko et al................. | 112/219 A X |
| 3,747,827 | 7/1973 | Stanton et al................... | 112/220 X |
| 3,761,790 | 9/1973 | Daab........................... | 112/219 A X |

*Primary Examiner*—Samuel Scott
*Assistant Examiner*—Lance W. Chandler
*Attorney, Agent, or Firm*—Michael S. Striker

[57] ABSTRACT

The arrangement includes a drive motor, a first output shaft, and a second output shaft. First and second clutches are each operative when activated for establishing torque-transmitting engagement between the motor and a respective one of the first and second output shafts. A negative-feedback control circuit is operative when activated for maintaining the ratio of the rotary speeds of the first and second output shafts at a preselected desired value by alternately activating and deactivating at least one of the clutches in dependence upon the discrepancy between the actual value of said ratio and the desired value thereof.

24 Claims, 8 Drawing Figures

ARRANGEMENT FOR DRIVING TWO OUTPUT SHAFTS

BACKGROUND OF THE INVENTION

The invention relates to an arrangement for driving two driven shafts of one or two machines in a rotary-speed-regulated manner.

Rotary-speed-regulated shaft-positioning arrangements are known by means of which an output shaft is driven from a motor through the intermediary of an electromagnetically activatable clutch. The clutch is operative to establish torque-transmitting engagement between the output shaft and the continuously rotating rotor shaft of the drive motor and/or to establish braking engagement between the output shaft and a friction brake, or other suitable brake arrangement. Such arrangements are known, for example, from French patent No. 1,583,056 (and corresponding U.S. Pat. No. 3,487,438), from German published patent application No. 1,613,350, from German published patent application No. 1,763,853 (and corresponding U.S. Pat. No. 3,532,953), and from German patent No. 2,054,501 (and corresponding U.S. Pat. No. 3,761,790). Drives of this type are employed, inter alia, for the driving of machine tools and industrial sewing machines.

In practice, it frequently arises that two shafts must be driven with their respective rotary speeds maintained in a constant ratio. For example, this is the case with machine tools when, besides the spindle, also the carriage is moved by means of a rotating drive shaft. Also, this is the case with automatic sewing machine arrangements of the type comprised of a main drive shaft of the sewing machine proper and an automatic cloth feeding apparatus driven by a shaft.

In the past, when there arose the need to thusly maintain constant the ratio of rotary speeds of two driven shafts, use was made of two entirely separate drive motors for the two shafts, or else a single common drive motor was employed in conjunction with a suitable transmission, for example a set of transmission gears, in order to establish the desired ratio between the rotary speeds of the two shafts.

The first expedient just mentioned is not only expensive, in that it involves the use of two motors, but also imperfect since the synchronization of the two shaft speeds, i.e., the maintaining constant of the ratio of the two speeds, is not very easily accomplished. The second expedient just mentioned does result in the maintenance of a constant ratio between the rotary speeds of the two driven shafts; however, it is then not particularly easy to change the speeds at which the shafts are driven, particularly by purely electrical means, and it is extremely difficult to change the ratio between the rotary speeds, particularly in a continuous or approximately continuous manner.

SUMMARY OF THE INVENTION

It is a general object of the invention to provide an arrangement for driving two (or more) shafts characterized by the extreme ease with which the speeds of the driven shafts and/or the ratio of such speeds can be changed and maintained at desired values.

This object, and others which will become more understandable from the description, below, of an exemplary embodiment, can be met, according to one advantageous concept of the invention, by providing a drive arrangement, comprising, in combination, a drive motor, a first output shaft and a second output shaft. There are also provided first and second clutch means each operative when activated for establishing torque-transmitting engagement between the drive motor and a respective one of the first and second output shafts. Negative-feedback control means is operative when activated for maintaining the ratio of the rotary speeds of the two shafts at a preselected desired value by alternately activating and deactivating at least one of the clutch means in dependence upon the discrepancy between the actual value of said ratio and the desired value thereof.

One advantage of the expedient just described is that the use of a second drive motor is not necessary. Moreover, the cost of the open-loop and closed-loop control circuitry for controlling the driving of the two shafts by the motor is hardly greater than the cost of such circuitry when only a single output shaft is involved. In particular the circuitry for maintaining a constant ratio between the rotary speeds of the two driven shafts can be relatively inexpensive and very compact. The motor of course must be capable of delivering the full output power needed by the two shafts. However, the clutches need be capable of transmitting only a part of such total output power. This characteristic of the inventive drive is particularly of significance in the case of very large total power requirements; it is not too difficult to provide a motor or adjust an already provided motor to furnish greater power output, but it has been difficult to increase the power-transmitting capability of the clutch, particularly for example a friction clutch.

Preferably, the two clutches are connected to the motor to form a single unit, for example enclosed within a single housing, so that the entire drive arrangement will be compact.

According to another advantageous concept of the invention, the motor is provided with a rotor shaft having two axial ends, each provided with a torque-transmitting circular drive plate; in other words, the principle of the known clutch and motor combination for varying the speed of a driven shaft is in effect doubled.

For a particularly effective removal of heat from the drive arrangement, a fan can be provided on the rotor shaft intermediate the drive plate and the rotor. As a further advantageous possibility, the drive plates, particularly on the facing axial sides thereof, can be configurated to serve as fans themselves.

According to another concept of the invention, the two clutches are provided with respective negative-feedback control circuits controlled by means of interconnected logic gates and by means of a synchronizing (i.e., speed-ratio-determining and -stabilizing) unit. The synchronizing unit, in particular, causes a constant ratio between the rotary speeds of the two driven shafts to be maintained, just as though the two shafts were interconnected by means of gearing. The synchronizing unit serves not only in the steady-state to maintain the ratio of rotary speeds constant, but also during acceleration and deceleration of the two (or more) driven shafts. This action is important in many practical applications. Furthermore, it is contemplated according to the invention to so design the synchronizing unit as to permit variation, even substantially continuous variation, of the negative-feedback-stabilized ratio of rotary speeds, in a very simple manner, for instance by changing the setting of a potentiometer. This is evidently a great improvement over systems employing variable-transmission-ratio mechanical transmissions, both in terms of flexibility and simplicity.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
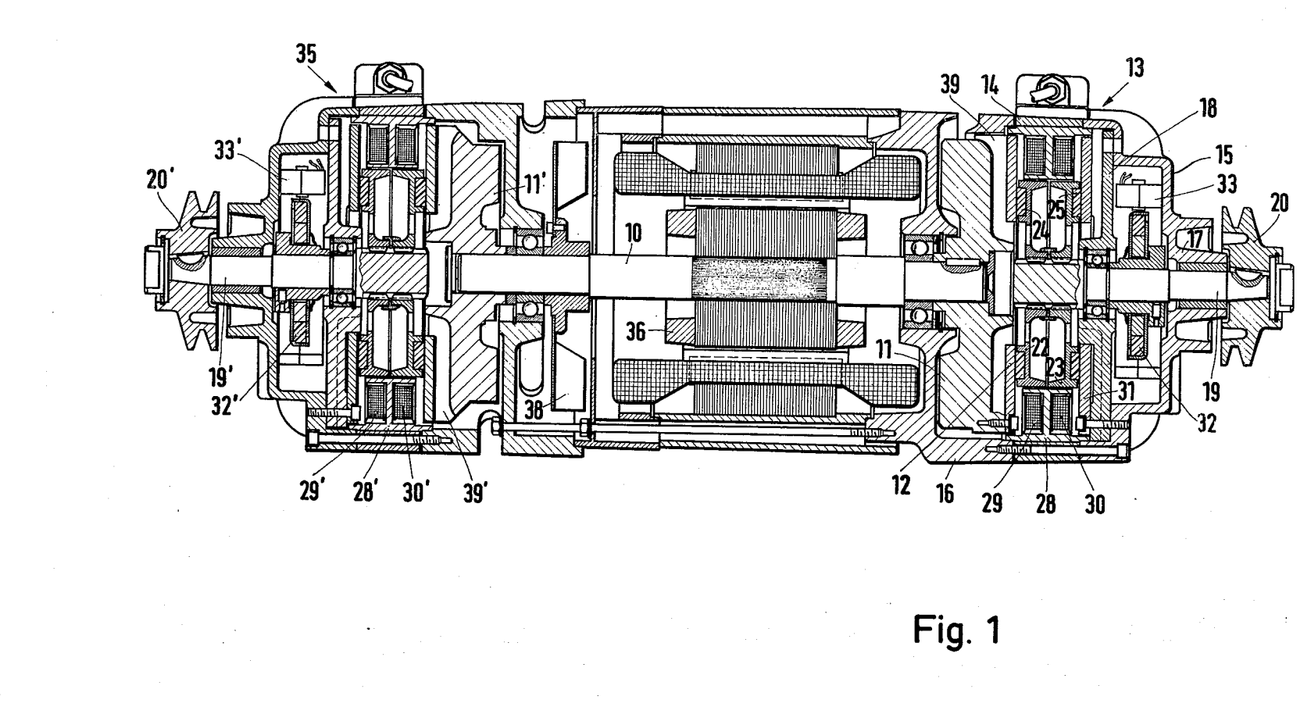
FIG. 1 is a longitudinal sectional view through an exemplary drive arrangement according to the invention.

The coupling motor depicted in FIG. 1 is comprised of a rotor shaft 10 which continuously rotates during operation of the motor. Connected to the right end of rotor shaft 10 (as viewed in FIG. 1) is a rotating body 11 non-rotatable relative to the rotor shaft 10. Mounted on the rotating body 11 is a ring 12 of magnetically conductive material. The rotating body 11 cooperates with an electromagnetic coupling, designated in toto by reference numeral 13, the housing 14, 15 of which is screwed onto a bearing plate 16 of the motor. The coupling 13 is in this manner combined with the motor to form a single structural unit.

In a hub portion 17 of the housing part 15 and in a braking disk 18 screwed onto the housing part 15, there is rotatably supported an output shaft 19. Mounted on the free end of the output shaft 19 is a drive pulley of a belt-type transmission arrangement. The drive pulley is so configured as to drive a drive belt having a generally V-shaped cross-section. Driven by such drive pulley 20 and drive belt is the driven shaft of a non-illustrated machine, for example the transport shaft of an automatic sewing machine arrangement. The end of the output shaft 19 spaced away from the drive pulley 20 carries a coupling disk or plate 22 and a brake disk 23, which are carried non-rotatably relative to the output shaft 19; however, the coupling disk 22 and brake disk 23 are axially shiftable along the length of the output shaft 19 to a limited degree. To this end, the output shaft 19 is advantageously provided with a splined profile matingly complementary to the inner profile of the hub portions of the coupling disk 22 and brake disk 23. Provided on the coupling disk 22 there is a ring-shaped coupling layer 24, whereas there is provided on the brake disk 23 a ring-shaped braking layer 25.

Clamped between the bearing plate 16 and the housing part 15 there is provided a winding housing 28 coaxially surrounding the coupling disk 22 and brake disk 23 and located inside the housing part 14. Provided inside the winding housing 28 there are a coupling winding 29 and a braking winding 30. When the coupling winding 29 is energized, a magnetic force is created which presses the coupling disk 22 with the coupling layer 24 thereon against the ring 12 of the rotating body 11. As a result, the output shaft 19 becomes coupled to the rotor shaft 10. If, instead, the braking winding 30 is energized, there is created a magnetic force which presses the brake disk 23 with its braking layer 25 against a ring 31 of the brake abutment member 18. Accordingly, the output shaft 19 is caused to slow down.

Further mounted on the output shaft 19 is a rotating portion 32 of a rotary speed measuring arrangement, the stationary part of which is designated by reference numeral 33.

This device described so far is known per se, for example from German published patent applications Nos. 1,613,346 and 2,134,751 and corresponding U.S. Pat. No. 3,487,438 and commonly owned U.S. patent application Ser. No. 270,619 of Kling. Accordingly, the operation of the device need not be described in detail herein. However, in contrast to the known arrangements, there is screwed onto the left-hand portion of the motor (as viewed in FIG. 1) a second electromagnetic clutch or coupling 35. The clutch 35 in the illustrated embodiment corresponds in structure to the electromagnetic clutch 13 just described. Parts of the second electromagnetic coupling which correspond to parts of the first clutch are designated by the same reference numeral, primed. A second output shaft 19' can be driven via the second clutch 35. This second output shaft 19' has associated with it a second rotary speed measuring unit 32', 33', corresponding to the right-hand unit 32, 33, and is provided at its end with a drive-belt drive pulley 20' adapted to drive a driven pulley via a drive belt having a generally V-shaped cross-section. The driven pulley can in turn serve to drive the driven shaft of an automatic sewing machine arrangement.

Between, on the one hand, the rotary body 11' associated with the clutch 35 and non-rotatably mounted relative to the left-hand end of the rotor shaft 10, and, on the other hand, the rotor 36 of the motor, there is provided on the rotor shaft 10 a fan 38 which serves to establish a self-ventilating action for the motor. A self-ventilating action for the clutches 13, 15 results from the fact that the rotary bodies 11, 11' are configurated as fan members provided with passages 39, 39' for the flow of cooling air. In this way, there is very effectively removed from the system both the heat generated as a result of the flow of current through the various windings and the heat generated as a result of frictional contact between the illustrated clutch and brake layers.

Figure 2:
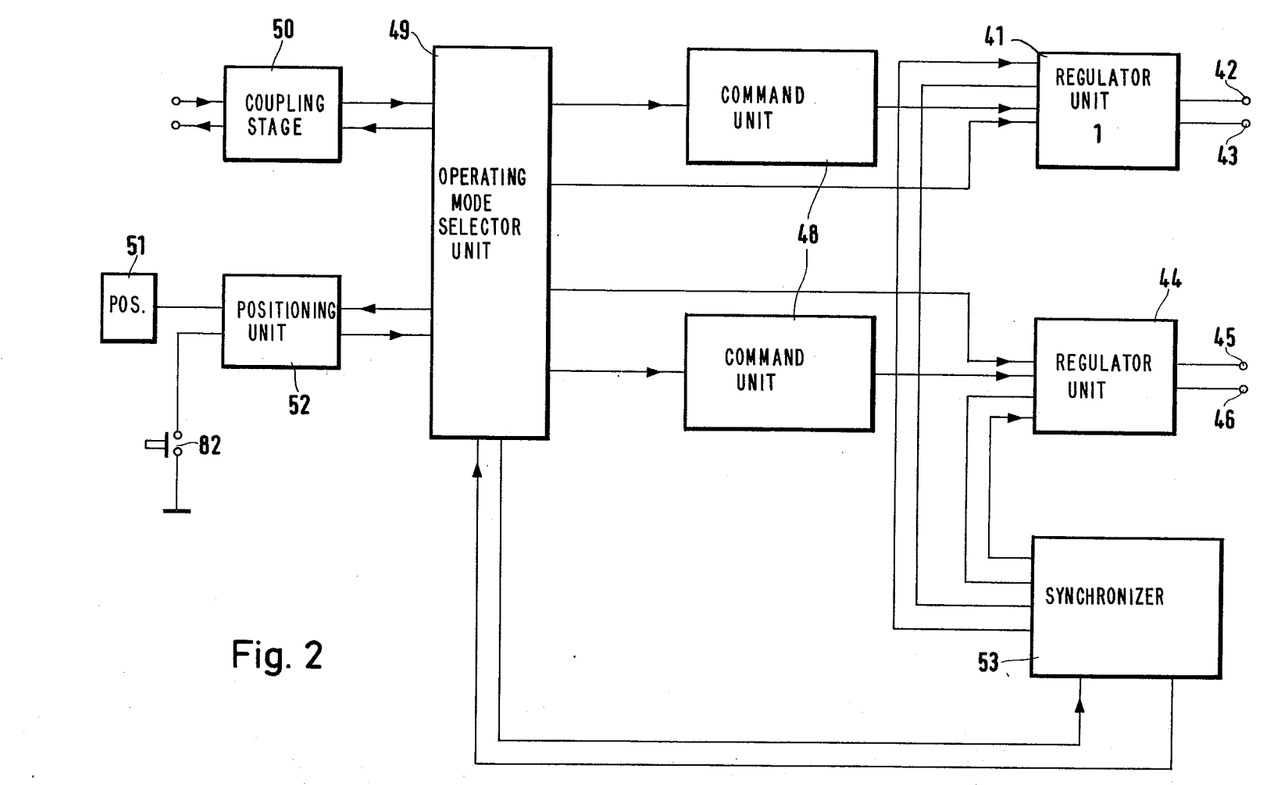
FIG. 2 is a very schematic block diagram of the open-loop and closed-loop control circuitry for the arrangement shown in FIG. 1.

The structural unit composed of the two clutches 13 and 35 and of the motor has associated with it a control and regulating arrangement depicted in FIG. 2 in block diagram form. Associated with the clutch 13 is a first regulator unit 41, the clutch winding 29 being connected to output 42 of regulator unit 41, and the brake winding 30 being connected to the output 43 of the regulator unit 41. The clutch 35 is controlled by a second regulator unit 44 having two outputs 45, 46, respectively connected to the clutch winding 29' and to the braking winding 30'.

Connected to the inputs of the two regulator units 41, 44 are two command units 48. The two command units 48 are operative for applying to the inputs of the two regulator units 41, 44 the same or differing desired-speed signals. These desired-speed signals may be of non-variable or variable magnitude. An operating-mode-selecting unit 49 permits selection of a particular operating mode. A coupling stage 50 serves to transmit various signals in a manner described in greater detail below. Further associated with the regulator unit 41 is a positioning arrangement 52 which operates in dependence upon the operation of a position indicator unit 51. A synchronizing unit 53, which can be rendered operative or inoperative at will, serves in cooperation with the regulator units 41, 44 to maintain the ratio between the rotary speeds of the two shafts 19, 19' at a preselected value, when this is desired.

Figure 3:
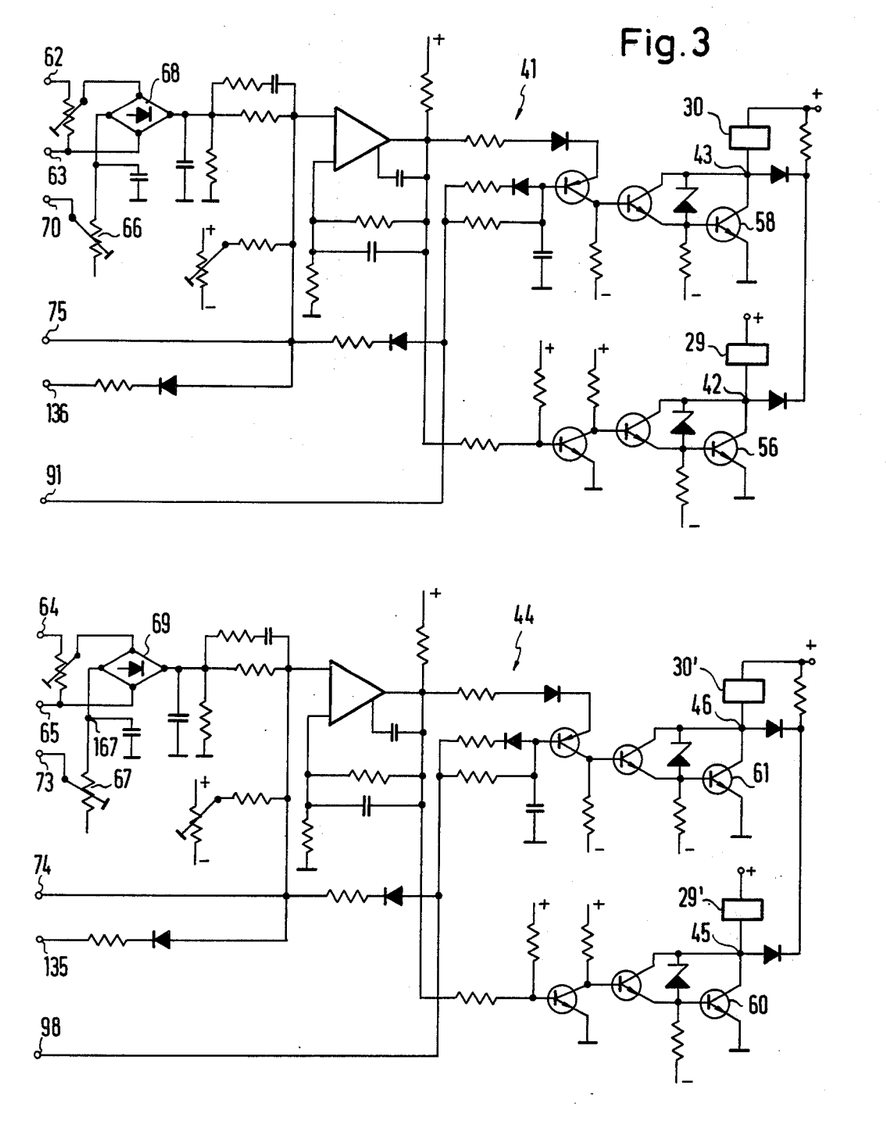
FIG. 3 depicts circuit details of boxes 41 and 44 of FIG. 2.

FIG. 3 depicts, in the upper half thereof, circuit details of the first rotary speed regulator unit 41 and, in the lower half thereof, circuit details of the second rotary speed regulator unit 44. The regulator unit 41 is comprised of a transistor switch 56, the emitter-collector path of which is connected in series with the clutch winding 29. The regulator unit 41 is further comprised of another transistor switch stage the principal component of which is a transistor switch 58, the emitter-collector path of which is connected in series with the braking winding 30. When the transistor 56 becomes conductive, the clutch winding 29 becomes energized. Likewise, when the transistor 58 becomes conductive, the braking winding 30 becomes energized. Analogously, there are respectively associated with the additional clutch winding 29' and with the additional braking winding 30' additional transistor switching stages essentially comprised of respective transistors 60 and 61. The output of the rotary speed measuring unit 32, 33 is connected directly across terminals 62, 63, whereas the output of the rotary speed measuring unit 32', 33' is connected across the terminals 64, 65. The application of the desired rotary speed signal is explained in detail further below.

The rotary speed regulator units 41 and 44 can be constructed and can operate essentially as disclosed in French patent No. 1,583,056 (and in corresponding U.S. Pat. No. 3,487,438) and in German patent No. 2,054,501 (and in corresponding U.S. Pat. No. 3,761,790). The disclosures of these four patents are incorporated herein by reference.

Figure 6:
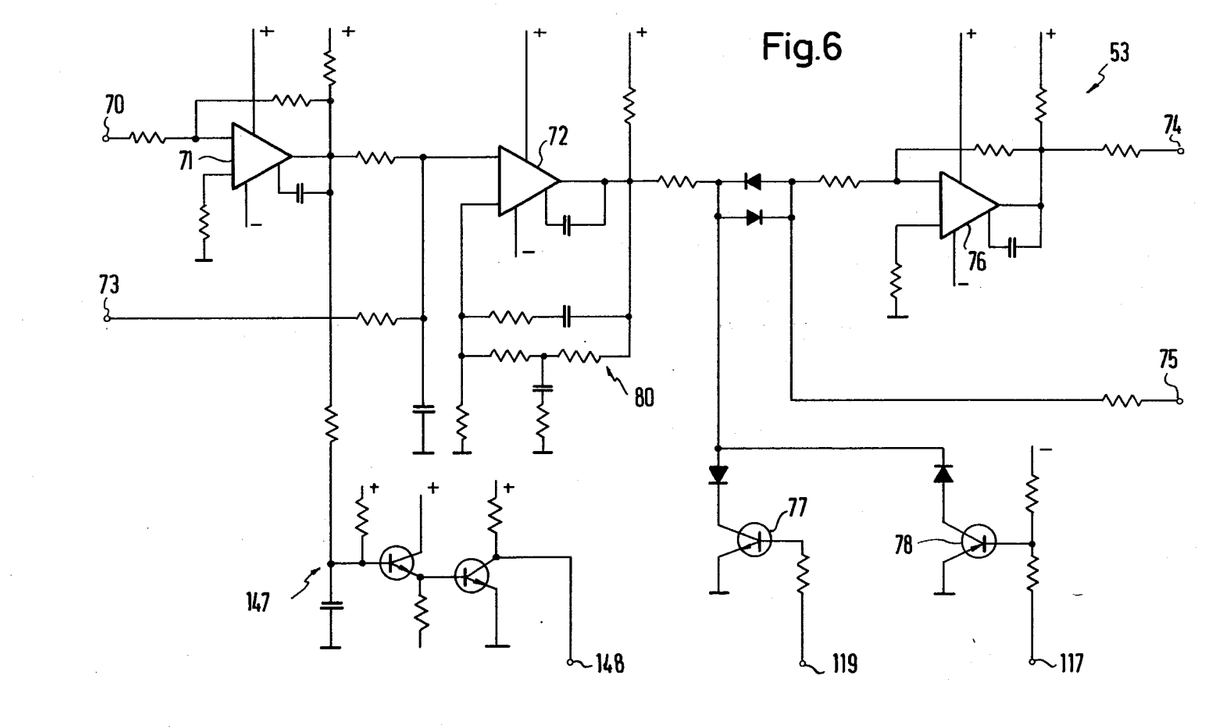
FIG. 6 depicts circuit details of box 53 of FIG. 2.

The synchronizing arrangement 53 of FIG. 2 is shown in detail in FIG. 6, and operates according to the following principle: Upon establishment of synchronization, the ratio of the respective rotary speeds $N_1$ and $N_2$ of the shafts 19' and 19 is maintained constant, i.e., $$N_1/N_2 = C_N = \text{constant} \quad (1)$$

The constant $C_N$ can be expressed as the quotient of two further constants $C_2$ and $C_1$, i.e., according to the equation $$C_N = C_2/C_1 \quad (2)$$

When the expression for $C_N$ given in equation (2) is substituted into equation (1), and the resulting equation suitably manipulated, one arrives at the equation $$C_1 \cdot N_1 - C_2 \cdot N_2 = 0 \quad (3)$$

Equation (3) indicates that the rotary speed ratio $N_1/N_2$ will be maintained at a constant value when the difference between these two rotary speeds $N_1$ and $N_2$, each multiplied by a respective constant factor $C_1$ or $C_2$, is maintained at zero. This requirement can be readily realized.

In the illustrated examplary embodiment of the invention, the multiplication of the rotary speeds $N_1$ and $N_2$ by their respective constant factors $C_1$ and $C_2$ is accomplished by providing respective potentiometers 67 and 66 (FIG. 3) connected to the respective full-wave rectifiers 68, 69 to which are respectively applied the output voltages of the rotary speed measuring units 32, 33 and 32', 33'. The wiper voltage of potentiometer 66 is applied via terminal 70 (FIGS. 3 and 6) to the input of an inverting operational amplifier 71 (FIG. 6). At the output of operational amplifier 71 there appears a voltage having a magnitude and polarity corresponding to the expression $-C_2 \cdot N_2$. This voltage is algebraically summed with the voltage at terminal 73 (FIGS. 3 and 6) and applied to the input of a further operational amplifier 72. The voltage at terminal 73 (FIG. 6) has a polarity and magnitude corresponding to the expression $C_1 \cdot N_1$ and is derived from the second potentiometer 67 (FIG. 3). Accordingly, there appears at the output of operational amplifier 72 (FIG. 6) a voltage having a magnitude and polarity corresponding to the expression $C_1 \cdot N_1 - C_2 \cdot N_2$. This voltage can be applied, via the terminals 74 and 75, to the rotary speed regulator units 41 and 44, serving as signals indicative of the discrepancy between the desired and actual rotary speeds. The intermediate connection in the circuit of FIG. 6 of an inverting operational amplifier 76 between the output of operational amplifier 72 and the terminal 74 serves to cause the respective rotary-speed discrepancy-indicating signal to have such an effect upon the rotary speed regulator units that one of these effects a speed increase while the other effects a speed decrease. The ensuing regulating or discrepancy-eliminating operation causes the difference $C_1 \cdot N_1 - C_2 \cdot N_2$ to decrease to approximately zero. A switching stage comprised essentially of transistors 77 and 78 makes it possible to selectively terminate the operation of the synchronizer, i.e., when it is not desired to maintain constant the ratio of the rotary speeds of the two output shafts 19 and 19'.

To maintain the ratio of the two rotary speeds nearly constant even during changes of the desired-speed signal or signals, i.e., when it is desired to effect acceleration or deceleration of the output shafts 19 and 19', it is advantageous to so design the feedback network 80 of the operational amplifier 72 (FIG. 6) that the transfer function of the operational amplifier 72 has an integral and/or a first derivative character.

From equation (3) it follows that the ratio of the two rotary speeds can be changed at will, by changing the setting of the potentiometer 66 and/or of the potentiometer 67.

The illustrated two-output-shaft drive arrangement can be operated in various modes. For example, a single one of the two output shafts 19, 19' can be caused to rotate at a negative-feedback-stabilized speed. As another possibility, the two output shafts 19, 19' can be caused to rotate with a negative-feedback-stabilized ratio of respective rotary speeds. As a further possibility, the two output shafts 19, 19' can be caused to rotate at respective negative-feedback-stabilized rotary speeds selected independently of each other, without any negative-feedback stabilization of the ratio of the two rotary speeds, this constituting normal operation. As another possibility, after the synchronizing unit 53, which when operative maintains the ratio of the two rotary speeds constant, is rendered inoperative, the shafts 19, 19' are brought down to a predetermined residual speed and caused to turn at such residual speed for a predetermined time interval (in general between 50 msec. and 1 sec.), whereupon the position-indicator unit 51 is rendered operative and the drive is caused to stop the driven shafts upon the reaching of a predetermined angular position thereof. A pushbutton-activated switch 82 (FIG. 2) is provided for causing the shafts to assume a second predetermined angular position. When the switch 82 is activated, the two shafts 19, 19' turn at low speed until they reach a second predetermined angular position whereupon they are again arrested. So long as the pushbutton-activated switch 82 remains activated, the output shafts 19, 19' are maintained in the second predetermined angular position thereof.

The details of the negative-feedback stabilizing operation and of the control operation are as follows:

If only a single one of the two output shafts 19, 19' is to be coupled to the drive motor, then by means of a (non-illustrated) switch the input terminal 84 of a coupling stage 50 (FIG. 8) is connected to ground. Depending upon the wiring of the circuit, the thusly generated command signal is transmitted from the output 85 of the coupling stage 50 to either an input 86 or else an input 87 of the operating-mode-selecting unit 49 depicted in FIG. 7.

Figure 4:
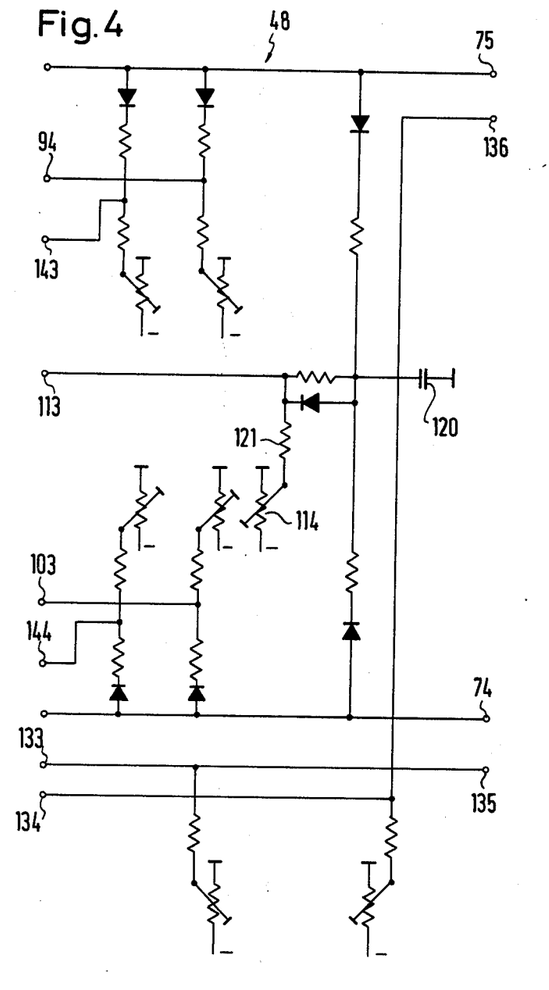
FIG. 4 depicts circuit details of boxes 48 in FIG. 2.

In the event the output 85 is connected to the input 86, the just-mentioned command signal is transmitted via an inverter 88 and a NOR-gate 89. By way of the inverter 88, the output of a NOR-gate 90 and accordingly the terminal 91 connected to such output assume logic level "0". The stop signal at the input of the rotary speed regulator unit 41 (FIG. 3) is caused to terminate. There appears at the output of gate 89 (FIG. 7) a "1" signal, resulting in the rendering non-conductive of hitherto conducting transistor 93. As a result, the short circuit voltage condition at the terminal 94 connected to the collector of transistor 93 ends. The desired-speed signal selected by means of the command unit 48 (FIG. 4) is now transmitted via the terminal 75 to the input of the rotary speed regulator unit 41. The output shaft 19 is caused to rotate at the corresponding rotary speed. During this time there is applied via the input 87 (FIG. 7) a 1 signal to the input of an inverter 96. As a result, by way of a NOR-gate 97 and a terminal 98 a "stop" command signal is applied to the rotary speed regulator unit 44. The braking winding 30' has become energized; the output shaft 19' is held stationary. By way of a NOR-gate 99 connected to the outputs of the inverters 88 and 96 a blocking signal in the form of a logical 1 signal is applied to a NAND-gate 100, as a result of which the synchronizing arrangement 53 is maintained inoperative by way of the circuit stage 77, 78 (FIG. 6).

Figure 7:
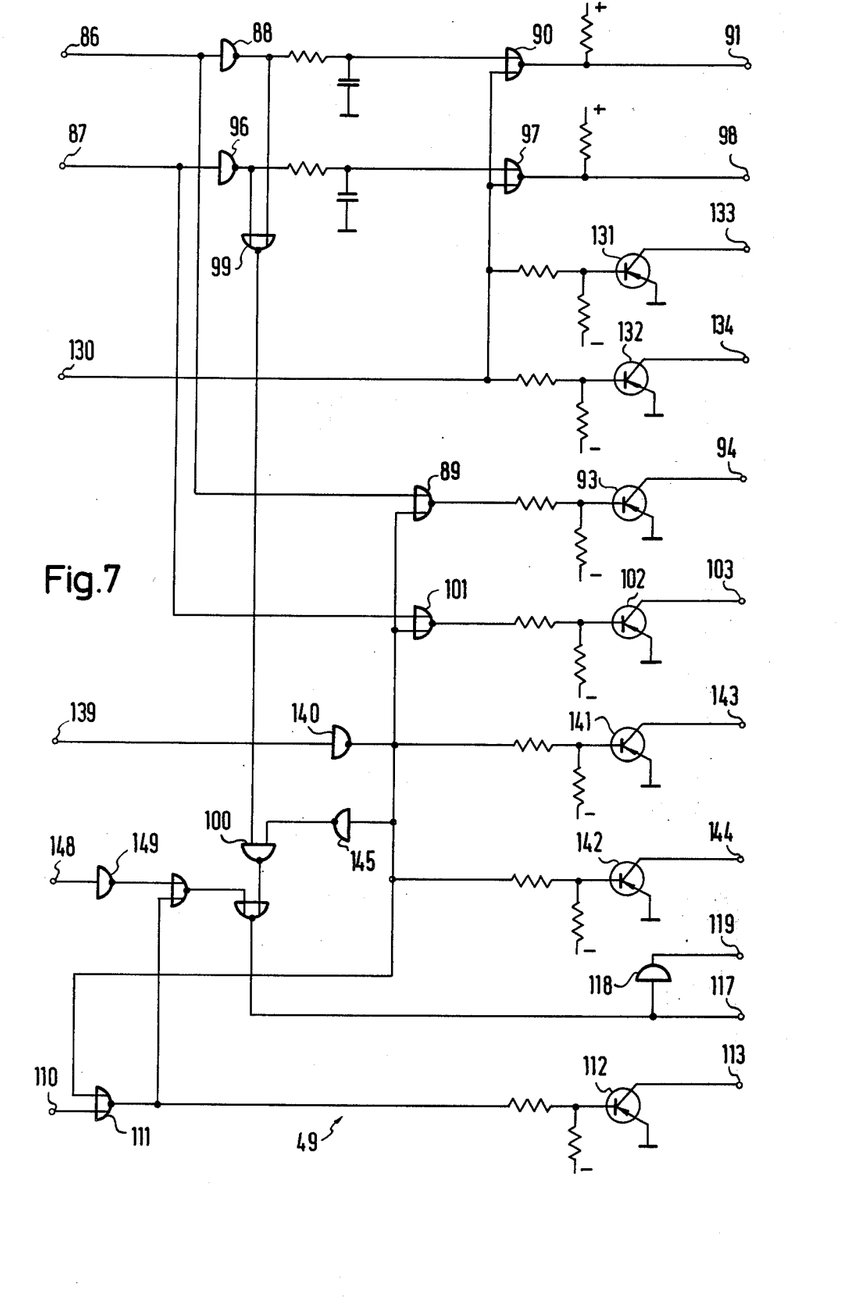
FIG. 7 depicts circuit details of box 49 of FIG. 2.

If, in contrast to the situation just described, the output 85 is connected to the input 87, then when the input 84 is grounded, in an analogous manner, and by way of the inverter 96 and the gate 97, the stop command signal on the terminal 98 for the rotary speed regulator unit 44 is lifted; by way of a NOR-gate 101 a hitherto conductive transistor 102 is rendered non-conductive, in order to terminate the short-circuit voltage condition on the terminal 103 of the rotary speed command unit 48 and in order to thereby permit the shaft 19' to rotate at a preselected rotary speed.

If, in addition to the input 84, also the input 105 (FIG. 8) of the coupling stage 50 is grounded, by a further non-illustrated switch, then, by way of a command unit designated in toto with reference numeral 106, the output 107 of which is connected to the terminal 94 or to the terminal 103, the commanded or desired rotary speed, as represented by the corresponding command signal, decreases by a predetermined amount, so that the output shaft 19 or 19' rotates with a lower rotary speed.

Figure 8:
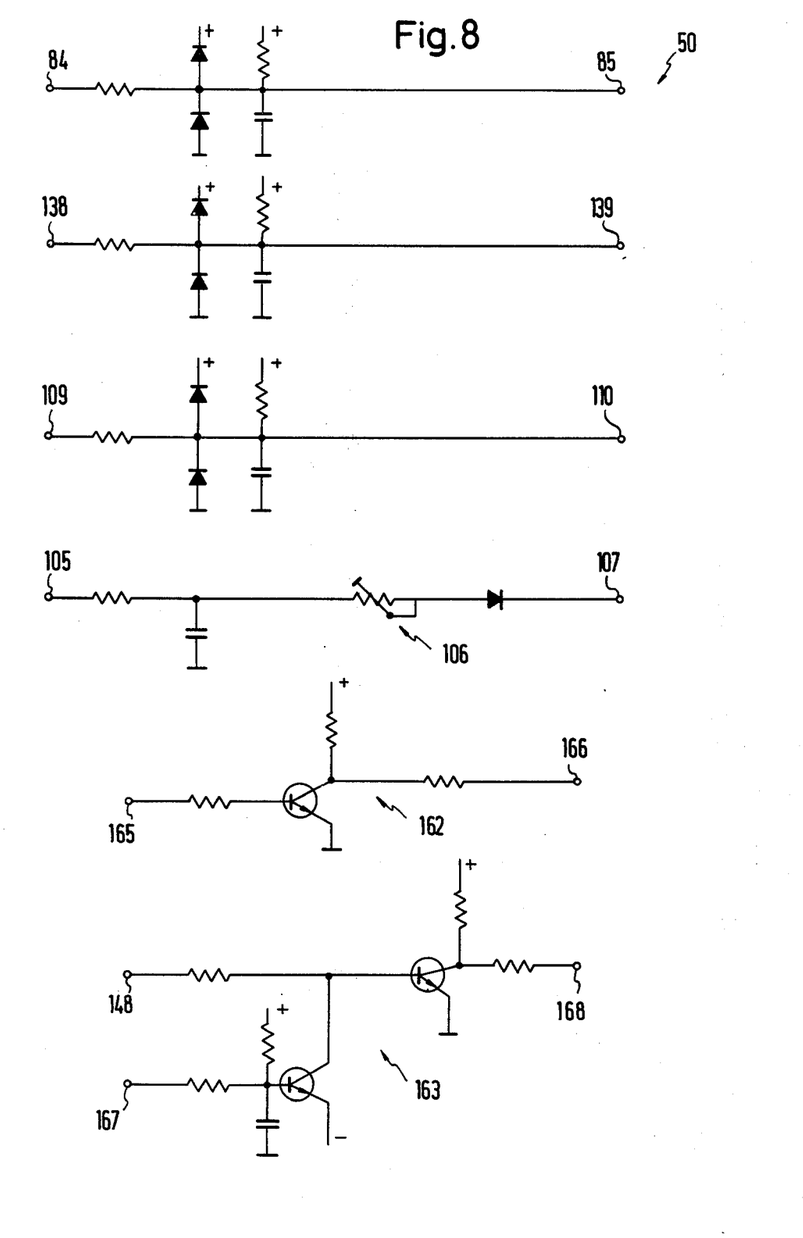
FIG. 8 depicts circuit details of box 50 in FIG. 2.

When it is desired to cause both shafts 19, 19' to rotate, with the ratio between their respective rotary speeds maintained at a predetermined constant value, then a (non-illustrated) switch is closed, to ground the input 109 of the coupling stage 50 (FIG. 8). A 0 signal appears on the terminal 110. As a result, by way of a NOR-gate 111 of the oprating-mode-selecting unit 49 (FIG. 7), a hitherto conductive transistor 112 is rendered non-conductive. Consequently, the short circuit voltage condition on the terminal 113 connected to the collector of transistor 112 ends. By means of a potentiometer 114 (FIG. 4) a rotary speed command signal, or signal representing desired rotary speed, is applied to both rotary speed regulator units 41, 44. Both output shafts rotate.

The gate 111 causes a terminal 117, by way of NOR-gates 115 and 116, to assume logic level 1, and causes a terminal 119 by way of an inverter 118 to assume logic level 0. As a result, the hitherto conductive transistors 77, 78 of the synchronizing arrangement 53 (FIG. 6) are rendered non-conductive. The short-circuiting to ground of the outputs of these transistors ends. The synchronizing arrangement can now control the regulator units 41, 44 by way of the terminals 74, 75. If now the actual rotary speed ratio $N_2/N_1$ deviates from the preselected desired value therefor, then negative-feedback error-correcting signals are applied to the rotary speed regulator units 41, 44 via the terminals 74, 75. As a result, the rotary speed of the output shaft 19 decreases and the rotary speed of the output shaft 19' increases, or vice versa, until the ratio $N_2/N_1$ of rotary speeds reassumes the preselected desired value.

It has proven to be particularly advantageous to transmit the desired-speed signal appearing on the terminal 113 (FIGS. 7 and 4) via an RC-time-delay stage 120, 121 (FIG. 4), the time constant of which is greater than the mechanical time constant of the clutch system. This deliberately introduced time delay assures to a greater degree stable system performance, particularly during periods of acceleration.

Figure 5:
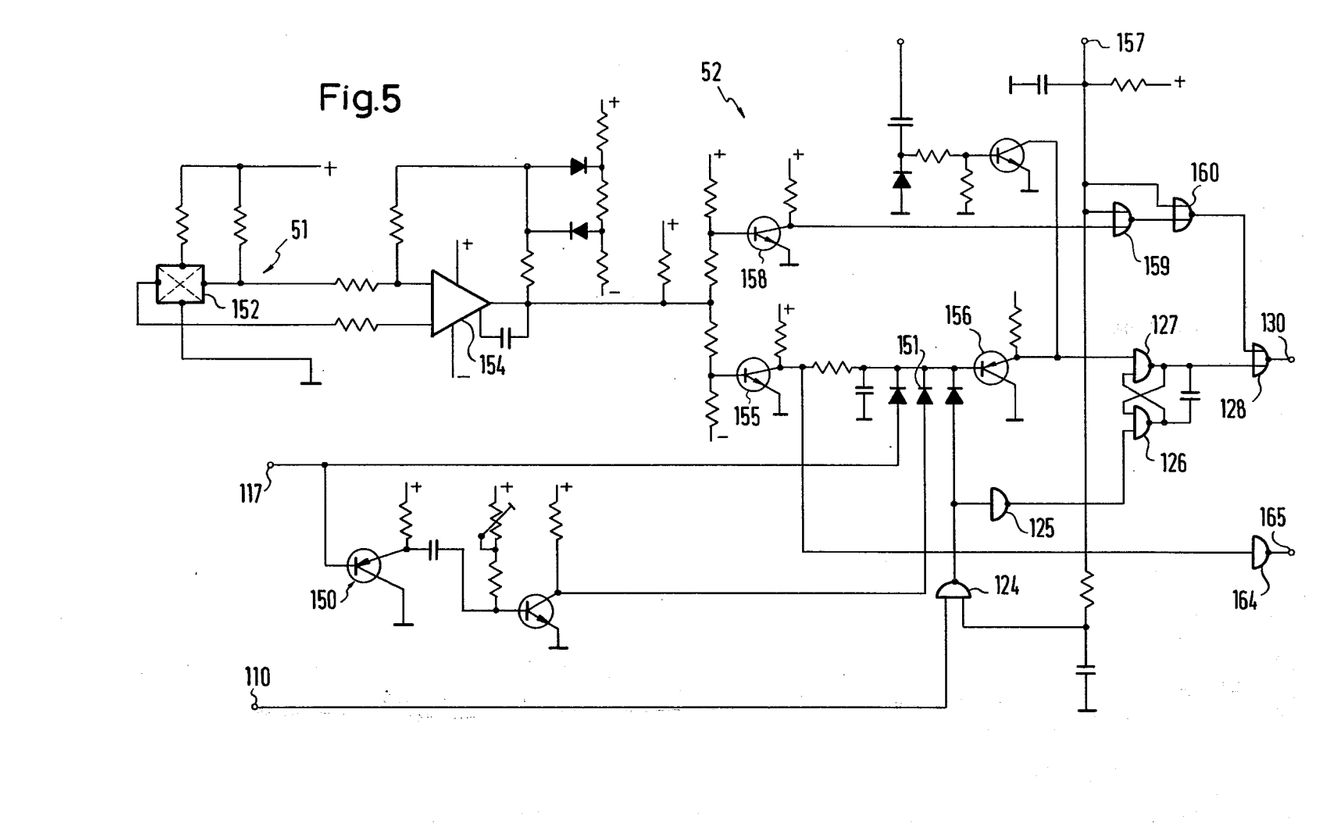
FIG. 5 depicts circuit details of boxes 51 and 52 of FIG. 2.

One input of a NAND-gate 124 of the positioning arrangement 52 (FIG. 5) is likewise connected to the terminal 110. Accordingly, when the input 109 of the coupling stage 50 is grounded and a 0 command signal appears at the terminal 110, the flip-flop comprised of the gates 126, 127 will become set, via the gate 124 and an inverter 125. By way of a NOR-gate 128 connected to the output of gate 127, a 1 signal is applied to the terminal 130. As a result, the hitherto conductive transistors 131 and 132 in the operating-mode-selecting unit 49 become non-conductive. The short-circuiting to ground of the terminals 133, 134 respectively connected to the collectors of these transistors 131, 132 is accordingly terminated. Via the terminals 135, 136 there are applied to the two rotary speed regulator units 41, 44 from the command unit 48 desired speed signals for a predetermined low rotary speed. By way of the terminal 130 and the gates 90, 97, the terminals 91, 98 are brought to logic level 0, i.e., the stop command signals are terminated.

If it is desired to control by means of negative feedback the two clutches independently of each other, then in addition to the input 109 also the input 138 of the coupling stage 50 is grounded by means of a non-illustrated control switch. This command signal, in the form of a 0 signal, appears at terminal 139 which is connected to the input of an inverter 140 of the operating-mode-selecting unit 49. There appears at the output of the inverter 140 a 1 signal which renders two hitherto conductive transistors 141, 142 non-conductive. At the terminals 143, 144, which are respectively connected to the collectors of transistors 141, 142, the effective short-circuiting to ground accordingly ends. Both rotary speed regulator units 41, 44 can now receive from the command unit 48 (FIG. 4) freely selected desired-speed signals.

The 1 signal at the output of the inverter 140, by way of the gates 89 and 109, furthermore renders the transistors 93 and 102 conductive, as a result of which the terminals 94, 103 become effectively short-circuited to ground. By way of an inverter 145 and the gates 100, 16 as well as by the gate 111, the synchronization of the two output shafts is terminated and the command potentiometer 114 (FIG. 4) is rendered inoperative.

At the end of a machine operation involving shafts 19, 19' the signal at the input 138 of coupling stage 50 (FIG. 8) is again removed, whereupon the negative-feedback-stabilized synchronized mode of operation (stabilized ratio between the two rotary speeds) resumes.

When the command signal on the input 109 is removed, both clutch units cause the respective output shafts to brake down to the slow speed which is resorted to when the shafts are to be positioned in predetermined angular positions. From the synchronizing unit 53 there is derived, by way of a checkback stage 147, a checkback signal which appears at terminal 148 as a 1 signal. By way of an inverter 149 (FIG. 7) of the operating-mode-selecting unit 49 (FIG. 7) a 1 signal is applied to one input of the gate 115. By way of the gate 116 the terminal 117 assumes logic level 0 and the terminal 119 assumes logic level 1. The transistors 77, 78 of the synchronizing arrangement 53 (FIG. 6) are rendered conductive, resulting in the rendering inoperative of the synchronizing arrangement (i.e., rendering inoperative of the arrangement which maintains a predetermined ratio between the rotary speeds of the two output shafts). The positioning arrangement is unblocked. The 0 signal appearing on terminal 117 triggers a monostable multivibrator 150 of the positioning arrangement 52 (FIG. 5), thereby for a predetermined time interval preventing via a diode 151 the positioning operation from occurring. This predetermined time interval is so selected as to assure that the rotary speed during the positioning operation has reached a stable value by the time the position indicator 51 generates the stop command signal.

The position indicator 51 can include a stationary Hall generator 152, past which there moves a permanent magnet mounted for movement synchronously with the output shaft to be positioned. Position indicators of this type are known, for example, from German patent No. 1,763,675 (and corresponding U.S. Pat. No. 3,582,739) and from German published patent application No. 1,943,162 the disclosures of which are incorporated herein by reference for details concerning the operation of the position indicator 51.

Upon elapse of the time interval associated with the metastable state of monostable multivibrator 150, the next positioning signal generated by the Hall generator 152 is applied via an operational amplifier 154 and a transistor 155 to a transistor 156, as a result of which the flip-flop 126, 127 is caused to undergo a change of state, thereby sending stop command signals to the terminls 91 and 98, by way of the gate 128, the terminal 130 and the gates 90, 97. The braking windings 30, 30' are energized. The output shafts 19, 19' are braked quickly to a standstill.

The shafts having now assumed respective first predetermined positions, it may be desired to cause them to move to second predetermined positions; for example in the case of a sewing machinee, the first and second positions may respectively correspond to the raised-needle and lowered-needle positions, or vice versa. To effect the assumption of the second predetermined position, the pushbutton-activated switch 82 (FIG. 2) is closed. As a result, from the terminal 125 (FIG. 5) by way of the gate 124 and the inverter 157, a set signal is applied to the flip-flop 126, 127. By way of a transistor amplifier stage 158, NOR-gates 159, 160 and the NOR-gate 128, the next positioning signal is applied to the terminal 130, and the brake windings become energized, thereby arresting the shafts in the second position.

After reaching this second position, if the switch 82 is again opened, by releasing the pushbutton, the position-indicating signal will be blocked by the gates 159, 160. Since the flip-flop 126, 127 is still in set condition, the stop signal is removed until a new positioning signal from the transistor 155 resets the flip-flop.

The coupling stage 50 (FIG. 8) includes two output stages 162 and 163. The output stage 162 is connected with the collector of the transistor 155 of the positioning arrangement 52 by way of a gate 164 and a terminal 165. It supplies to the output 166 a position check. The output stage 163 is connected with the terminal 148 of the checkback stage 147 as well as with a terminal 167 leading to one end of the potentiometer 67 (FIG. 3). It supplies at the output 168 a standstill verification signal for both clutches. The output signals appearing on the outputs 166, 168 can, for example, be employed to control accessory units which are to be automatically activated when the output shafts 19, 19' are stopped in the predetermined positions.

It will be understood that each of the elements described above, or two or more together, may also find a useful application in other types of circuits and constructions differing from the types described above.

While the invention has been illustrated and described as embodied in a two-output shaft drive unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications withou omitting features that, from the standpoint of prior art, fairly constitute essential characteristics of the generic or specific aspects of this invention.

What is claimed as new and desired to be protected by Letters Patent is set forth in the appended claims:

1. A drive arrangement, comprising, in combination, a drive motor; first and second output shafts; first and second clutch means each operative when activated for establishing torque-transmitting engagement between said motor and a respective one of said first and second output shafts; first and second braking means for braking the rotary motion of respective ones of said output shafts; and negative-feedback control means operative when activated for maintaining the ratio of the rotary speeds of said first and second output shafts at a preselected desired value by alternately activating and deactivating at least one of said clutch means and at least one of said braking means in dependence upon the discrepancy between the actual value of said ratio and said desired value thereof.

2. A drive arrangement as defined in claim 1, wherein said control means further includes means for varying said desired value.

3. A drive arrangement as defined in claim 1, wherein said control means further includes means operative when activated for maintaining the rotary speed of each of said shafts at a respective preselected desired value independent of the rotary speed of the other of said shafts by activating and deactivating said first and second clutch means in dependence upon the discrepancy between the actual rotary speeds of said shafts and the desired values thereof.

4. A drive arrangement as defined in claim 1, wherein said control means further includes means for substantially continuously varying said desired value.

5. A drive arrangement as defined in claim 1, wherein said motor has an uninterruptedly rotating rotor, wherein said first and second clutch means are both friction clutch means each operative when activated for establishing torque-transmitting engagement between said uninterruptedly rotating rotor and a respective one of said output shafts.

6. A drive arrangement as defined in claim 1, wherein said control means further includes means for continuously varying said desired value, means for maintaining the rotary speed of said shafts at predetermined desired values by activating and deactivating said first and second clutch means in dependence upon the discrepancy between the actual rotary speeds of said shaft and the desired values thereof, and means for substantially continuously varying the desired values of the rotary speeds of said shaft.

7. An arrangement as defined in claim 1, wherein said motor has two axial ends, and wherein each of said first and second clutch means is provided at a respective one of said two axial ends.

8. An arrangement as defined in claim 1, wherein said motor and said first and second clutch means are provided with a common housing, so as to form a single unit.

9. An arrangement as defined in claim 1, wherein said motor has a rotor shaft having two axial ends at opposite axial ends of said motor, and wherein said first and second clutch means are operative when activated for establishing torque-transmitting engagement between a respective one of said output shafts and a respective one of the axial ends of said rotor shaft.

10. An arrangement as defined in claim 9, wherein said rotor shaft is provided at each axial end thereof with a driven plate mounted non-rotatable relative to the rotor shaft for driving a respective one of said output shafts when the respective one of said first and second clutch means is engaged.

11. An arrangement as defined in claim 1, wherein said control means comprises means automatically operative when the actual value of said ratio exceeds the desired value of said ratio for activating one of said clutch means and deactivating the other of said clutch means, and automatically operative when the actual value of said ratio falls below the desired value of said ratio for activating said other one of said clutch means and deactivating said one of said clutch means.

12. An arrangement as defined in claim 10, wherein said motor is further provided with fan means mounted on said rotor shaft non-rotatable relative to said rotor shaft for cooling said motor during operation of the latter.

13. An arrangement as defined in claim 10, wherein said driven plates are each configurated at the axial sides thereof facing each other as fans for cooling said motor during operation of the latter.

14. An arrangement as defined in claim 1, wherein said control means is comprised of first and second actual-value-indicating means for generating respective first and second signals indicative of actual rotary speed and first and second potentiometers connected across the outputs of said actual-value-indicating means for transmitting the respective first and second signals to error-correcting control circuitry in said control means, said desired value of said ratio being substantially continuously adjustable by varying the settings of at least one of said potentiometers.

15. An arrangement as defined in claim 1, wherein said first and second clutch means are each provided with a respective control input, and wherein each of said control means is operative for establishing engagment between the respective one of said output shafts and said motor when the signal applied to the control input thereof is of one polarity and of predetermined magnitude and operative for establishing braking engagement between the respective one of said output shafts and the respective one of said braking means when the signal applied to the control input thereof is of the opposite polarity and of predetermined magnitude, and wherein said control means comprises means for generating a control signal having a magnitude and polarity corresponding to the difference between first and second quantities, the first quantity being the product of the rotary speed of said first shaft and a predetermined first factor, and the second quantity being the product of the rotary speed of said second shaft and a predetermined second factor, and means for applying said control signal to one of said control inputs with inverted polarity and to the other of said control inputs with non-inverted polarity, whereby when a discrepancy arises between the desired and actual values of said ratio one of said output shafts is brought into braking engagement with the respective brake means to slow it down while the other output shaft is brought into torque-receiving engagement with said motor to speed it up.

16. An arrangement as defined in claim 15, wherein said control means includes means for adjusting the value of at least one of said first and second factors.

17. An arrangement as defined in claim 15, wherein said control means further includes means for adjusting the values of said first and second factors independently of each other.

18. An arrangement as defined in claim 15, wherein said means for generating a control signal comprises means for generating a first signal having a magnitude corresponding to said first quantity and a second signal having a magnitude corresponding to said second quantity, a summing amplifier having a first input connected to receive said first signal directly and also having a second input, an inverter having an input connected to receive said second signal directly and having an output connected to said second input of said summing amplifier.

19. An arrangement as defined in claim 18, wherein said summing amplifier has a feedback network whose transfer function has an integral and/or a first derivative character.

20. An arrangement as defined in claim 19, wherein said means for applying said control signal to one of said control inputs with inverted polarity comprises an inverter having an input connected to the output of said summing amplifier and having an output connected to said one of said control inputs.

21. An arrangement as defined in claim 15, wherein the signals applied to said control inputs of said clutch means have such polarity that when the actual value of said ratio departs from said desired value the shaft having the higher rotary speed is braked and the shaft having the lower rotary speed is accelerated.

22. An arrangement as defined in claim 1, wherein each of said clutch means exhibits a certain time delay between the time of activation thereof and the establishing of torque-transmitting engagement, and wherein said control means further includes desired speed varying means for varying the value of the desired rotary speed of said shafts, and time delay means operative for delaying the effect of changes in the value of the desired rotary speed by a time interval greater than said time delay.

23. An arrangement as defined in claim 1, and further including a plurality of logic gates interconnected to form means for causing said control means to become activated and deactivated.

24. An arrangement as defined in claim 1, said arrangement further including first and second shaft selecting means activatable for effecting rotation of only a single respective one of said shafts at a predetermined negative-feedback-stabilized speed, and a plurality of logic gates interconnected to form means for activating and deactivating said control means and said first and said second shaft selecting means.

* * * * *